United States Patent
Ahuja et al.

(10) Patent No.: US 10,404,838 B2
(45) Date of Patent: Sep. 3, 2019

(54) SYSTEMS AND METHODS FOR SELECTING MICROSERVICES TO PROCESS PROTOCOL DATA STREAMS

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Elanthiraiyan Ammoor Anbalagan, Sunnyvale, CA (US); Lee Chik Cheung, Foster City, CA (US); Sumanth Gangashanaiah, Cupertino, CA (US); John Richard Guzik, Sunnyvale, CA (US)

(73) Assignee: ShieldX Networks, Inc., San Jose, CA (US)

( * ) Notice: Subject to any disclaimer, the term of this patent is extended or adjusted under 35 U.S.C. 154(b) by 329 days.

(21) Appl. No.: 15/331,039

(22) Filed: Oct. 21, 2016

(65) Prior Publication Data
US 2018/0115635 A1    Apr. 26, 2018

(51) Int. Cl.
*H04L 29/06* (2006.01)
*H04L 29/08* (2006.01)
*H04L 12/46* (2006.01)

(52) U.S. Cl.
CPC ........ *H04L 69/166* (2013.01); *H04L 63/0428* (2013.01); *H04L 12/4633* (2013.01); *H04L 67/1097* (2013.01)

(58) Field of Classification Search
CPC ............... H04L 69/166; H04L 63/0428; H04L 12/4633; H04L 67/1097
See application file for complete search history.

(56) References Cited

U.S. PATENT DOCUMENTS

| | | | | |
|---|---|---|---|---|
| 7,839,873 | B1* | 11/2010 | Quach | H04L 47/10 370/389 |
| 8,873,556 | B1* | 10/2014 | Zuk | H04L 45/306 370/392 |
| 9,509,616 | B1* | 11/2016 | Judge | H04L 47/125 |
| 2004/0073553 | A1* | 4/2004 | Brown | H04L 69/16 |
| 2005/0281287 | A1* | 12/2005 | Niinomi | H04L 49/90 370/474 |
| 2009/0219931 | A1* | 9/2009 | Tu | H04L 51/30 370/389 |
| 2010/0080246 | A1* | 4/2010 | Iwakura | H04L 47/564 370/473 |

(Continued)

*Primary Examiner* — Brian Whipple
*Assistant Examiner* — James Ross Hollister
(74) *Attorney, Agent, or Firm* — Nicholson De Vos Webster & Elliott, LLP

(57) ABSTRACT

Systems and methods are described herein generally relating to network security, and in particular, embodiments described generally relate to systems and methods for selecting microservices to process protocol data streams. For example, a method is disclosed, which calls for receiving a protocol packet, the protocol packet comprising a sequence number, generating a difference by subtracting a protocol message base from the sequence number, generating a first quotient by dividing the difference by a protocol common message length, generating a second value using the first quotient, determining a Transmission Control Protocol (TCP) reassembly resource using the generated second value, and transmitting the protocol packet to the determined TCP reassembly resource.

12 Claims, 12 Drawing Sheets

(56) References Cited

U.S. PATENT DOCUMENTS

2014/0201838 A1\* 7/2014 Varsanyi .............. G06F 21/552
                                                        726/23
2015/0006749 A1\* 1/2015 Hendel .................. H04L 47/34
                                                        709/230

\* cited by examiner

SYSTEMS AND METHODS FOR SELECTING MICROSERVICES TO PROCESS PROTOCOL DATA STREAMS

TECHNICAL FIELD

Embodiments described herein generally relate to network security. In particular, embodiments described generally relate to systems and methods for selecting microservices to process protocol data streams.

BACKGROUND INFORMATION

The expansion of cloud computing services has led to datacenters housing collections of servers to provide computing capacity to run various applications. Data traveling between servers and client applications needs to be monitored for security. In a security system including a hierarchy of microservices, some services may be performed by more than one microservice. Selecting a microservice and load balancing among multiple microservices to process packets associated with a protocol stream may benefit performance.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
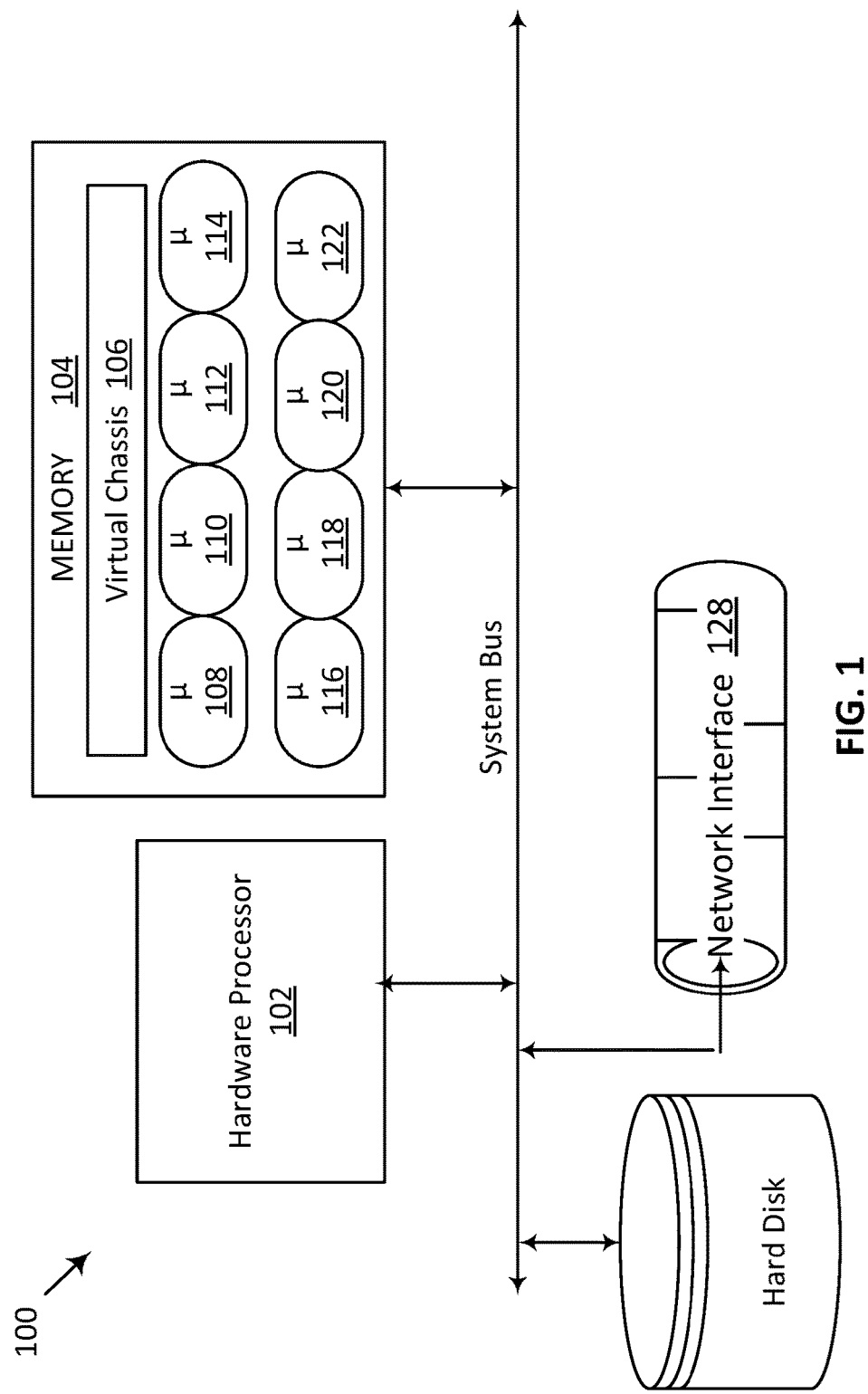
FIG. 1 is a block diagram illustrating computer hardware for loading network security system microservices from a memory and executing them by a processor.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Security systems are frequently deployed to provide encapsulated transport among datacenters or private networks. The security system provides a tunnel through which packet traffic may be routed as if the two ends of the tunnel were directly connected. Examples of such tunnels include SSL tunnels and IPSec tunnels. The tunnels commonly provide encryption services in such a way as to not impose any additional computation on the applications whose network traffic the tunnels support.

Examples of applications using such tunnels include an employee's email service connecting to the corporate network from home through a virtual private network (VPN) and a datacenter configuring a geographically remote replication service connected via IPSec. In each case, the user application (email and replication respectively) performs as if the application were running within one environment while being located remotely. A principal benefit of using a tunnel for such applications is the abstraction provided by the tunnel causing remote applications to behave as if they were connected locally.

The Benefits of such architectures include the ability to scale the tunnel capacity independent of the configuration of the networks on each side, security through encryption allowing the tunnel to traverse third-party networks and the ability to provide the appearance of a single datacenter from multiple geographically diverse constituents.

Tunnels employed for such a purpose may be configured using multiple redundant links (multiple fiber cables), redundant appliances (distinct security appliances) and a variety of security and routing protocols. SSL tunnels are frequently deployed over IP networks whereas IPSec encryption may be provided as an addition to GRE tunneling. Additionally, tunnels may consist of a plurality of virtual tunnels. As an example, a single tunnel as implemented by a network administrator may be deployed as a number of load-balanced virtual tunnels with distinct security associations (key material, block ciphers, etc.). As an example, a GRE tunnel may load balance packets transported by the tunnel over multiple virtual tunnels each with distinct IPSec encryption. Likewise, an SSL tunnel may be deployed as a number of load-balanced virtual tunnels (a number of SSL connection) among which network packets are load balanced. The use of multiple virtual tunnels is primarily driven by the performance requirement associated with encryption and decryption computation.

Each virtual tunnel requires cryptographic processing (at each end) to encrypt and decrypt packets. The throughput of a virtual tunnel is often limited by this encryption bottleneck. If more cores or threads are available within an appliance (physical or virtual) providing the tunnel processing, adding additional virtual tunnels can increase the processing capability. However, adding virtual tunnels complicates the deployment of the system as load balancing among the virtual tunnels is required. Additionally, the use of many virtual tunnels complicates TCP reassembly as the packets for a particular virtual tunnel are interspersed among those of every other virtual tunnel. The overall time required to deliver a sequence of packets along each virtual channel (as compared to a single isolated channel) increases proportionally to the number of virtual channels.

It is therefore desirable to provide a method by which tunnel protocols may be load balanced without the need for virtual tunnels and without the performance bottlenecks associated with a single tunnel encryption processing. Providing a single tunnel solution that still allows load balancing of encryption processing greatly simplifies configuration, allowing SSL and IPSec tunnels to perform at levels of 40 Gb/s to 100 Gb/s and higher using current compute server technology with only a single encryption tunnel.

To allow a single tunnel to distribute encrypted content to a scalable and configurable number of decryption processes, the present invention provides a protocol-defined window specification to overcome the TCP reassembly limitations of multiple channels. Instead of a single TCP reassemble microservice reassembling packet traffic and load balancing multiple SSL microservices, an interface microservice receives window specification feedback from a plurality of TCP reassembly microservices allowing it to load balance ranges of TCP traffic to different TCP reassembly microservices. Certain protocols (including security protocols such as SSL) transmit blocks of data that are segmented by TCP before being transported by IP routing. These blocks have defined headers that include a message type, message length and message data. Because the location of the message type and length are located at defined offsets, knowledge of the beginning of one block identifies the beginning of the next block in TCP sequence space. The next block type will not be known until it arrives, but can then be derived similarly using the offset.

For protocols wherein the message block is known and the common message type is known, load balancing decisions for TCP reassembly can be made at the packet level. This is the case for SSL wherein the vast majority of message blocks are data blocks (encrypted data) and the vast majority of those blocks have the same size. In one embodiment, the maximum TLS record size is 16432 bytes, plus a 5-byte header, which are transmitted in MTU-sized packets of 1448 bytes.

Given a first identified SSL data block (and the TCP sequence number of the beginning of the block), assuming that additional data blocks will follow allows packets for those blocks to be load balanced among TCP reassembly microservices using only the TCP sequence number of each packet. This process is scalable to any number of TCP reassembly microservices and TCP window sizes as long as the TCP sequencer number of the beginning of a first data message is known.

For data messages of size D, an initial TCP sequence number of S, and T TCP reassembly microservices, selecting one of the T TCP reassembly microservices for an incoming packet involves subtracting the initial TCP sequence number S from the packet sequence number and dividing the result by the message size D. The quotient of this process (modulo T) is the TCP microservice to utilize. This process continues to work until a non-data message (with a different message size) arrives at which point the initial sequence number can be reset to the end of the non-data message.

Each TCP reassembly microservice can now independently reassemble data messages from a single tunnel, provide those messages to a plurality of SSL microservices for decryption and scale in real-time to meet the processing needs of the tunnel. Although the preceding example utilized SSL as the example protocol, any protocol with a message format including a message length may be balanced in this manner removing the TCP reassembly and subsequent processing bottlenecks from the consequences of single-tunnel design.

FIG. 1 is a block diagram illustrating an embodiment of components of a scalable microservice architecture using microservices. Network security system microservices are stored in memory (e.g., volatile memory such as Random Access Memory (RAM) and/or non-volatile memory such as disk) and executed by one or more hardware processors or processor cores. Network security system microservices, consisting of computer-executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A network interface 128 (e.g., fabric or interconnect that is wired or wireless) provides a means for communicating with a data center. Network security system may inspect traffic, detect threats, and otherwise protects a data center, as further described below, using microservices.

Embodiments of a network security system providing the above capabilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes a hardware processor 102 (as detailed above), memory 104, and network interface 128. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize network interface 128 to explore the datacenter to discover what network segments exist, the security requirements of various network segments, what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122, (your 108-122), as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIGS. 2 and 3. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIGS. 2 and 3.

Network security system receives traffic via network interface 128 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIGS. 2 and 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

In an embodiment, microservices 108-122 are implemented using computer-executable instructions loaded from the Internet, via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

Environments for hosting virtual chassis 106

| Environment | Description |
| --- | --- |
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In some examples, network security system scales out using available resources to accommodate higher traffic or load. In an exemplary embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

A common property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of the operating system on which they were spawned.

Figure 2:
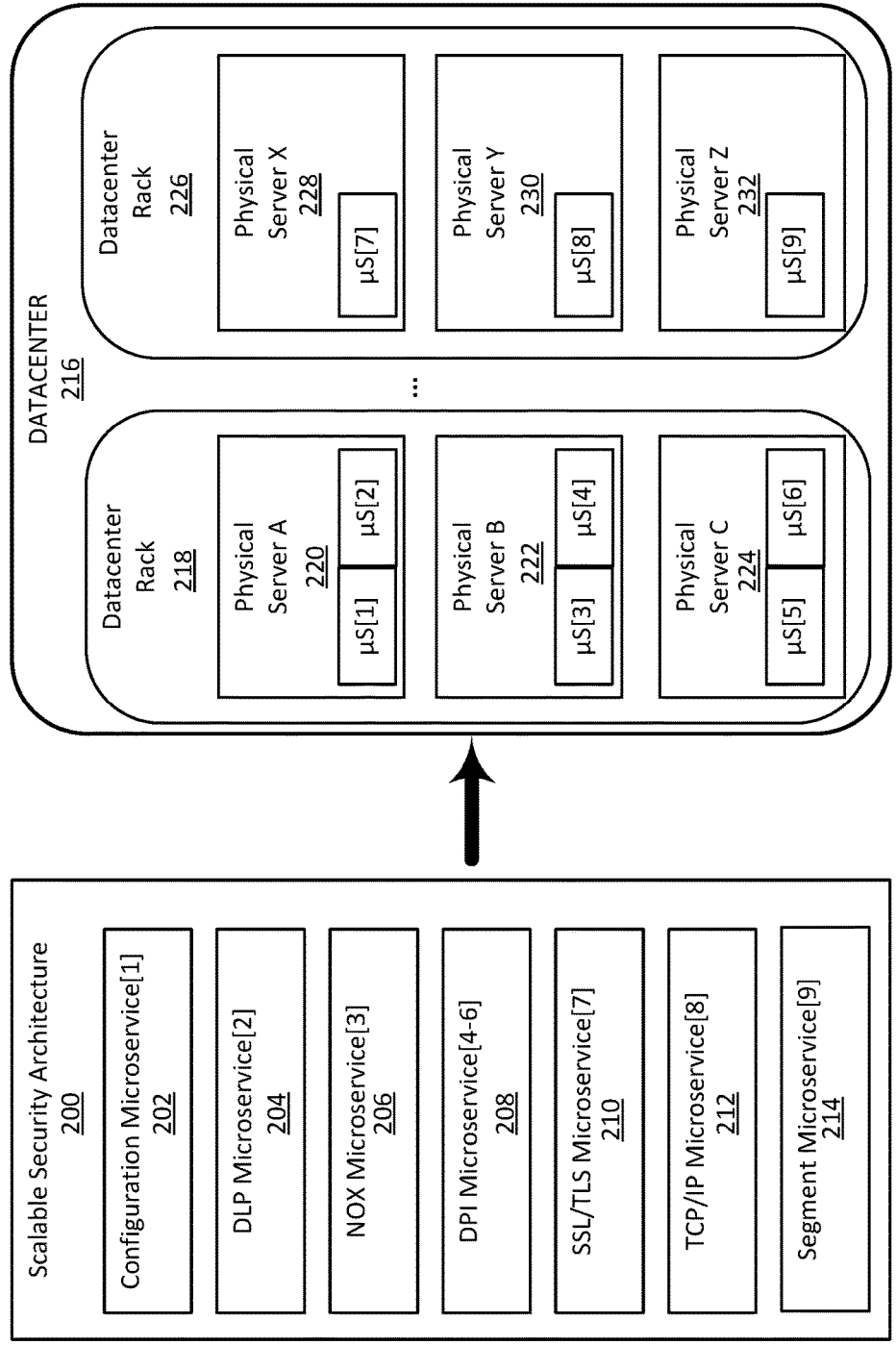
FIG. 2 is an embodiment of a scalable security architecture implementing a three-time scale out using security microservices.

FIG. 2 is a three-time scale out, according to an embodiment, using microservices. In this example, only a single microservice (DPI) would benefit from additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy is scaled and configured independently to load balance the supply of processed data to the next hierarchy level. As shown, datacenter 216 includes datacenter rack 218, which includes physical server A, 220, physical server B, 222, and physical server C, 224. As shown, datacenter rack 226 includes physical server X, 228, physical server Y, 230, and physical server Z, 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z, 220, 228, 230, and 232. A configuration microservice 202 creates a configuration backplane and a data plane deployed as a software component on each physical server that is to receive security services. This creating process takes the form of configuring routing rules, reserving network address space (such as a subnet) and configuring virtual environments to utilize portions of the reserved address space as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

Figure 3:
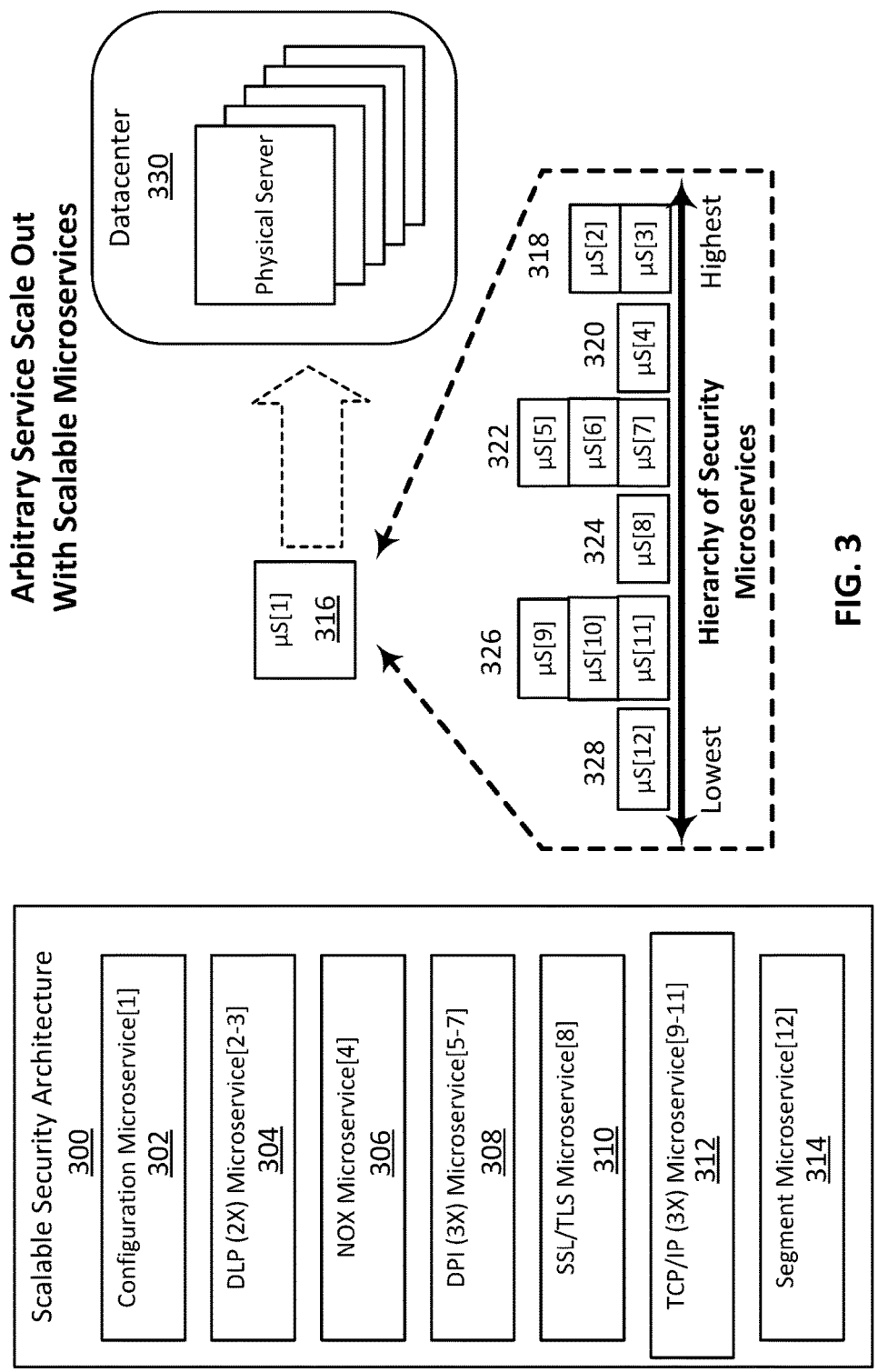
FIG. 3 is an arbitrary scaling out of a microservice according to an embodiment.

FIG. 3 is an arbitrary scale-out according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316, provisions (your 318, 320, 322, 324, 326, and 328) the 11 microservices from a lowest hierarchy to a highest hierarchy, and configures them to communicate with each other via a backplane. The microservices are implemented by physical servers in datacenter 330.

Figure 4:
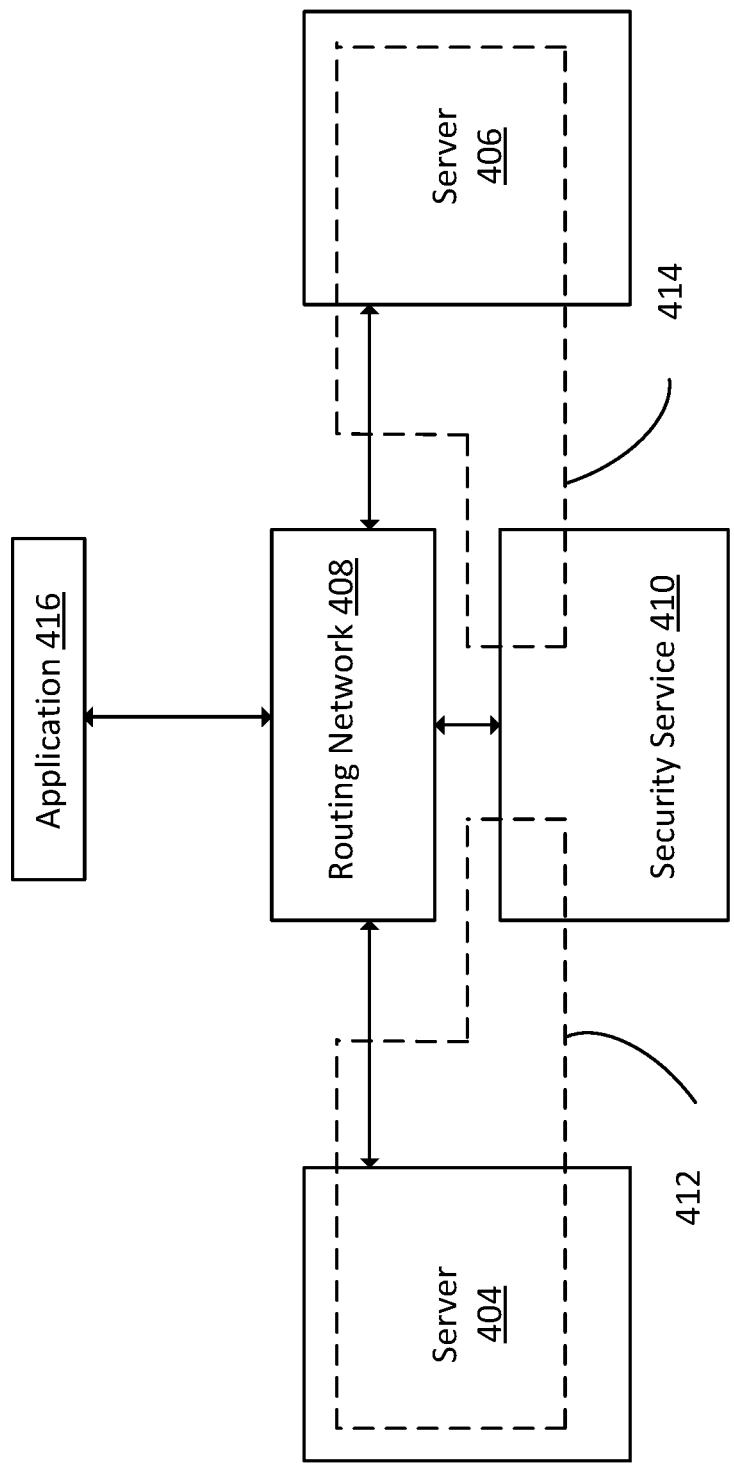
FIG. 4 is a block diagram illustrating a security service to monitor traffic between an Application and one or more servers through a routing network according to an embodiment.

FIG. 4 is a system level block diagram according to an embodiment. One or more security services 410 monitor traffic between an application 416 and one or more servers 404 and 406 through a routing network 408 according to an embodiment. The security service 410 is a group of microservices that used to secure traffic from/to the application 416 and the servers 404 and 406. These microservices do not need to be confined to one physical server such as server 404 or server 406. For example, one or more microservices of the security service 410 may be executed on server 404 and other microservices of the security service 410 are executed on server 406. In some embodiments, the security service 410 is executed on a server that it is not protecting.

Routing network 408 provides connectivity among server 404, server 406, security service 410, and application 416, and may support encapsulation protocols employed by embodiments disclosed herein. In some embodiments, routing network 408 is partially configured responsive to hypervisor configuration of servers 404 and 406.

By virtue of routing information included in channel data encapsulation packets, as explained further below, data traveling between an application 416 and server 404 and/or server 406 is routed to the correct server, and is kept separate from data traveling between the application 416 and the other server. Accordingly, what is essentially a private network 412 is created between the server running security service 410 and server 404. Similarly, what is essentially a private network 414 is created between the server running security service 410 and server 406.

Figure 5:
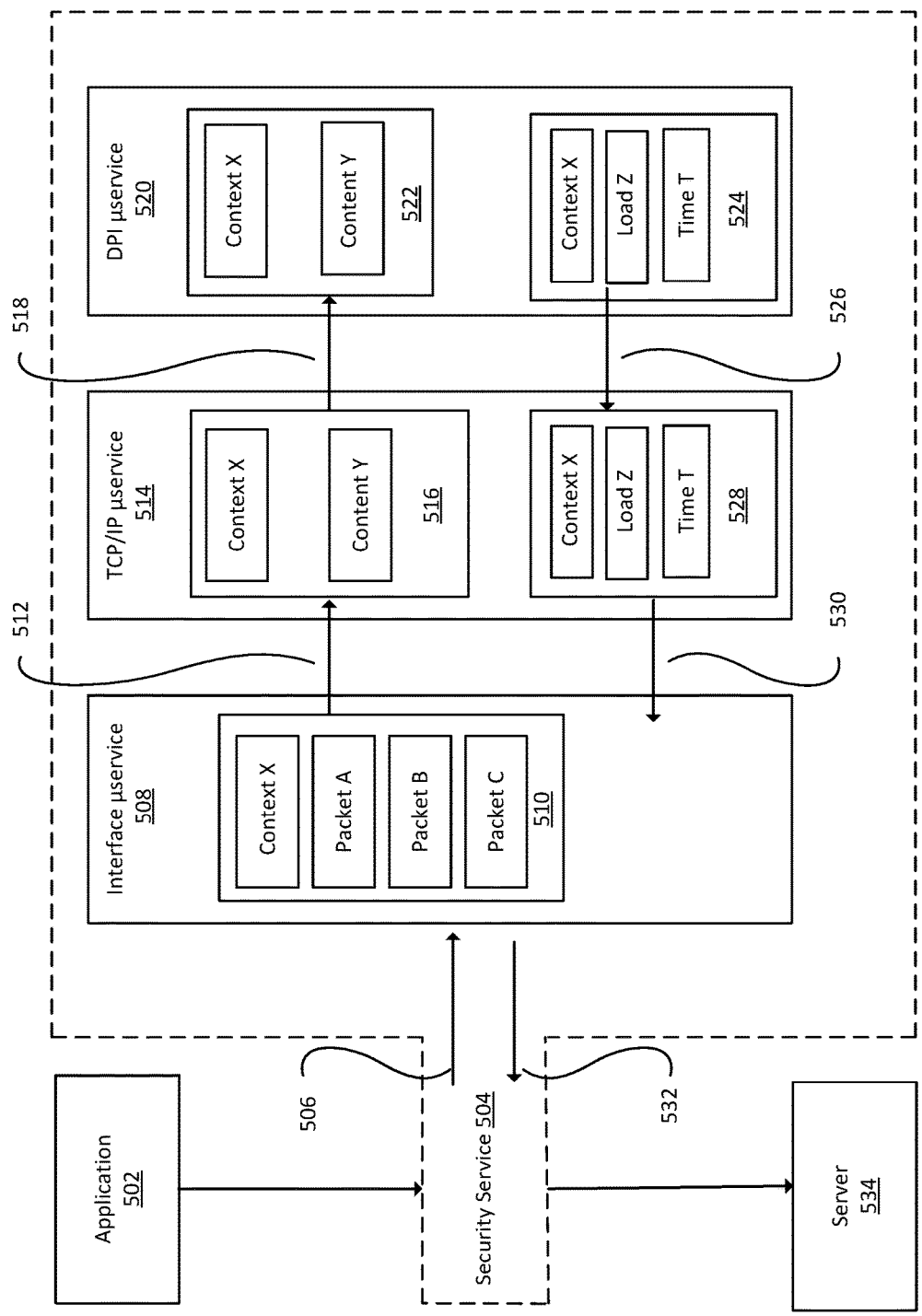
FIG. 5 is a block flow diagram illustrating application data traversing to a server after passing through a hierarchy of a security microservices according to an embodiment.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510, which encapsulates three packets A, B, and C, and context X. As shown, channel data encapsulation packet 510 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing to use for handling packets A, B and C. As an example, context X may be generated by performing a hash, longest prefix match or lookup of header fields such as IP addresses, TCP Ports, Interface Names (or MAC Addresses) or other packet properties. The lookup may be an exact match, longest prefix match or other method to associate packet streams with the same security processing to use. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) that will only rarely use stateful updates.

Interface microservice 508 transmits 512 the channel data encapsulation packet 510 to TCP/IP microservice 514. As shown the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 it to DPI microservice 520. As shown the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 520 transmits, via path 526, channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCPI/IP load Z, and TCP/IP Timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP Timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.μservice The benefits of the security service 504 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 508 to all subsequent microservices that no longer have access to the original packets. By providing load and timestamp data in the channel data encapsulation packets 524 and 528, which are returned via paths 526 and 530, the microservices receive and can maintain real-time loading and processing latency information utilized to make load balancing decisions.

Figure 6:
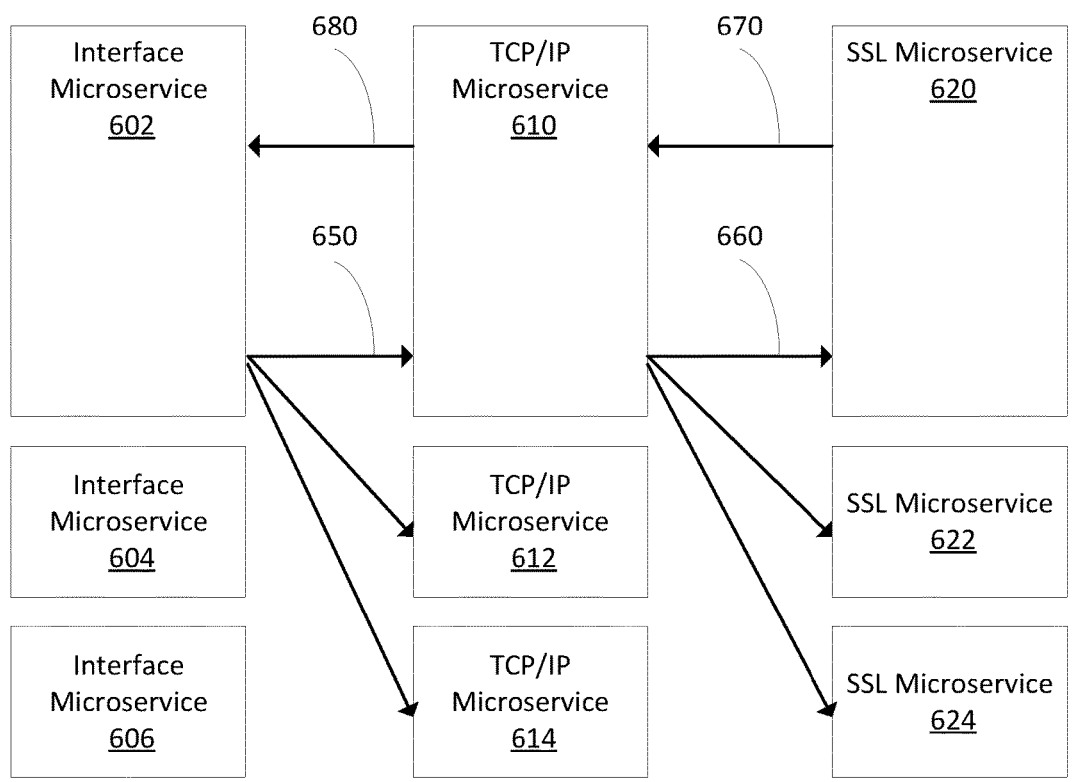
FIG. 6 is a block flow diagram illustrating selecting microservices within a hierarchy of microservices to process protocol data streams according to an embodiment.

FIG. 6 is a block flow diagram illustrating selecting microservices within a hierarchy of microservices to process protocol data streams according to an embodiment. As shown, the hierarchy of microservices includes interface microservices 602, 604, and 606, which are to receive network traffic, including protocol streams.

The interface microservices select one of TCP/IP microservices 610, 612, and 614, to which to transmit protocol stream datagrams, via path 650. In some embodiments, the selection is based on a load balancing. In some embodiments, the interface microservices transmit SSL protocol streams to any of the TCP/IP microservices. In alternate embodiments, the interface microservices use the source IP address, destination IP address, and other information to select a TCP/IP microservice to which to route packets. Using source and destination addresses to select a TCP/IP microservice may instill what is substantially a round-robin selection mechanism. If incoming network traffic consists of many different SSL flows, the use of the TCP/IP microservices may be well-balanced.

The TCP/IP protocol is an ordered protocol, in which each data packet includes a sequence number, and the packets are processed in order. Sending a flow of packets to a single TCP/IP microservice may ease reassembly and ordering of packets. If the interface microservice distributes a flow of packets to multiple TCP/IP services, other mechanisms—such as time-based ordering—are used to allow reassembly of packets in proper order. The selected TCP/IP microservice, here 610, selects one of SSL microservices 620, 622, and 624, to which to transmit protocol stream datagrams, via path 660. In some embodiments, the selection is based on a load balancing.

Figure 7:
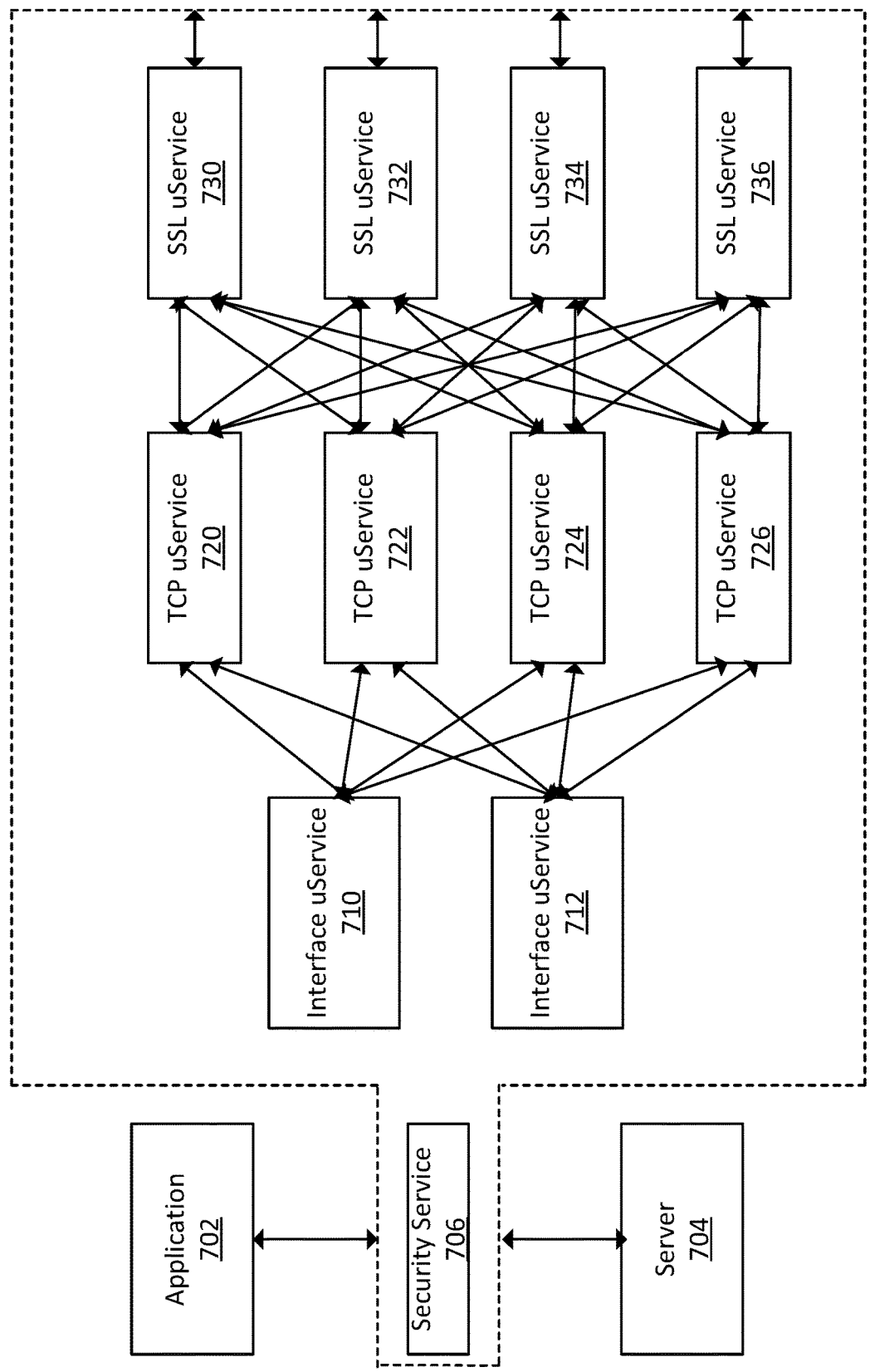
FIG. 7 is a block flow diagram illustrating selecting microservices within a hierarchy of microservices to process protocol data streams according to an embodiment.

FIG. 7 is a block flow diagram illustrating selecting microservices within a hierarchy of microservices to process protocol data streams according to an embodiment. As shown, security service 706 monitors security of network traffic traveling between application 702 and server 704. 706 includes interface microservices 710 and 712, TCP microservices 720, 722, 724, and 726, and SSL microservices 730, 732, 734, and 736. Interface microservices 710 and 712 are shown spreading TCP traffic flows among multiple TCP microservices, which reassemble the TCP packet flows and spread them among multiple SSL microservices. When the incoming TCP packets are associated with different flows—for example, when their source and destination IP addresses differ—the traffic may be efficiently spread among multiple microservices to be processed concurrently. In some embodiments, the interface microservices distribute TCP packets associated with the same flow to multiple TCP microservices, but sequences them in time to maintain their order.

Figure 8:
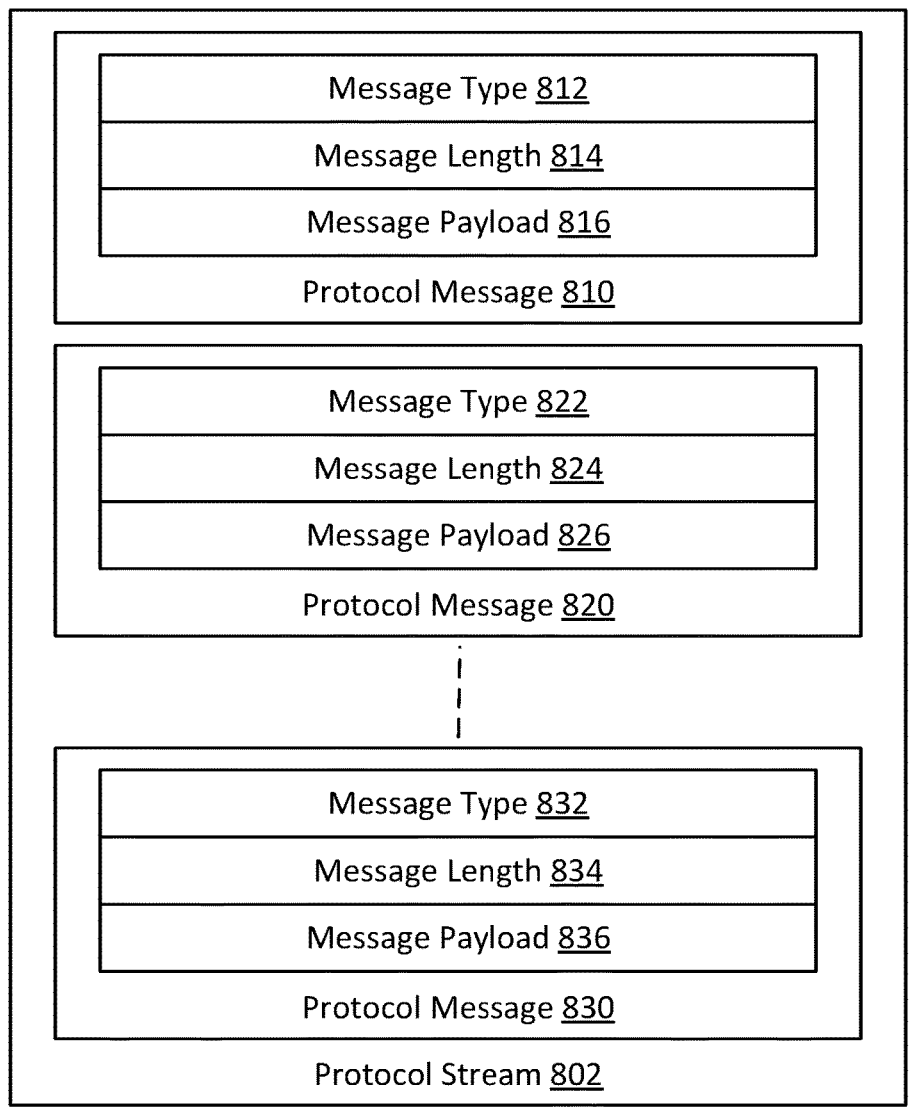
FIG. 8 is an embodiment of a protocol stream format carrying protocol messages.

FIG. 8 is an embodiment of a protocol stream format carrying protocol messages. Certain protocol streams are defined by message blocks formatted as illustrated in FIG. 8. SSL protocol streams have a number of different message types and different sub-types, such as "Hello" messages used to set up connections, keep alive messages used to keep a connection alive in the absence of data, change cipher spec messages, and data transport messages. As illustrated, protocol stream 802 includes protocol message 810, which consists of message type 812, message length 814, and message payload 816. Protocol stream 802 also includes protocol message 820, consisting of message type 822, message length 824, and message payload 826, and protocol message 830, consisting of message type 832, message length 834, and message payload 836.

Protocol messages 810, 820, and 830 are transported using TCP protocol in which every packet contains a sequence number. A TCP packet of sequence number S and length L is said to occupy the TCP sequence space S to S+L. When protocol message 810 is received, message length 814 may be used to determine the starting sequence number of protocol message 820.

Figure 9:
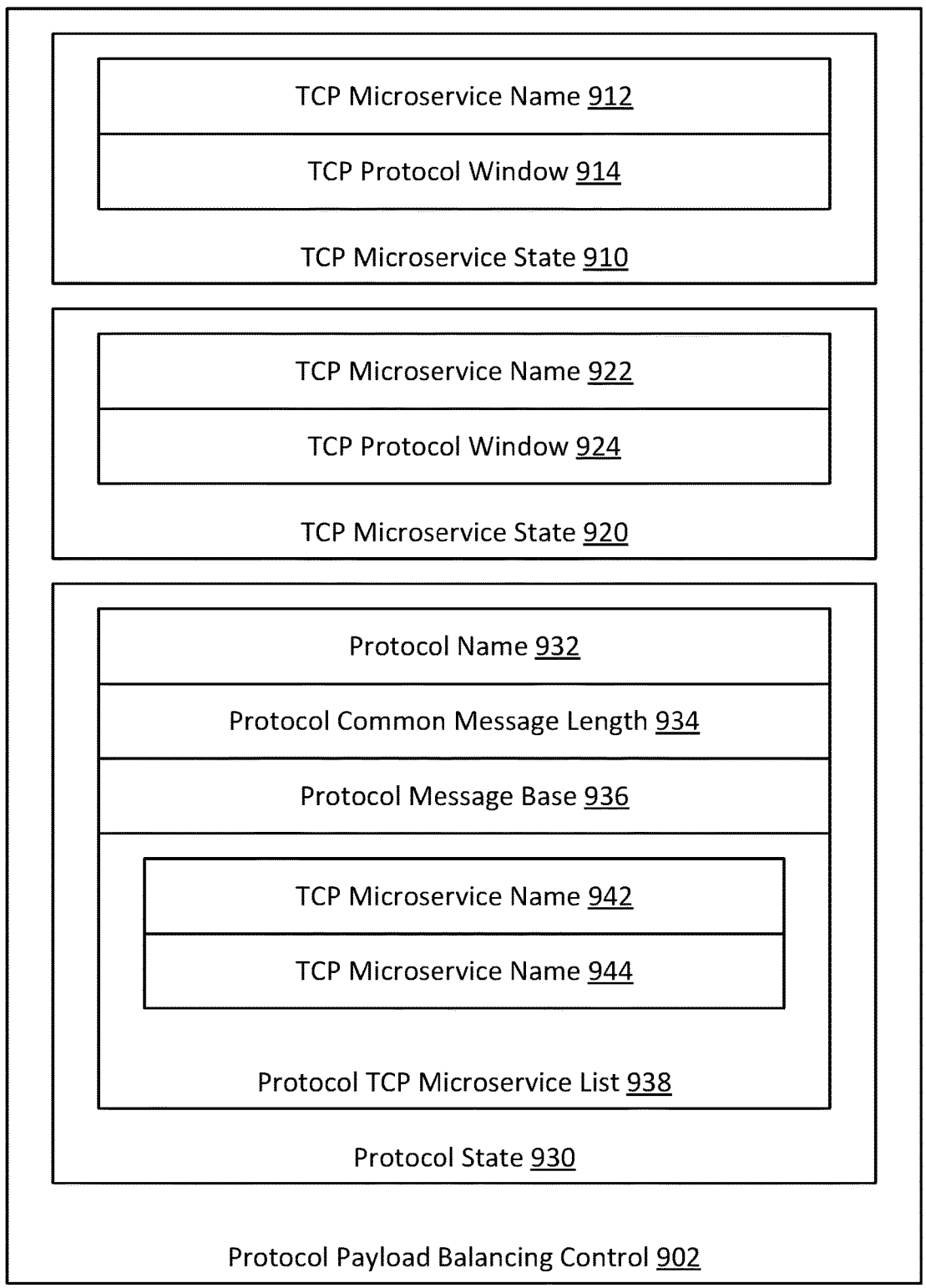
FIG. 9 is an embodiment of a protocol payload balancing control structure.

FIG. 9 is an embodiment of a protocol payload balancing control structure. As illustrated, protocol payload balancing control 902 includes TCP microservice state 910, TCP microservice state 920, and protocol state 930. TCP microservice state 910 includes TCP microservice name 912 and TCP protocol window 914. TCP microservice state 920 includes TCP microservice name 922 and TCP protocol window 924. In some embodiments, protocol windows 914 and 924 define a range of packet sequence numbers to be processed by each of TCP microservices 912 and 922. TCP microservice names 912 and 922 define names associated with each of TCP microservice state 910 and TCP microservice state 920.

Protocol state 930 includes protocol name 932, protocol common message length 934, protocol message base 936, and TCP microservice names 942 and 944. In some embodiments, TCP microservice names 942 and 944 correspond to TCP microservice names 912 and 922. TCP microservice list 938 includes protocol common message length 934, which defines a common length associated with incoming TCP packets. In some embodiments, an interface microservice uses protocol payload balancing control 902 to select a TCP microservice to which to transmit incoming SSL protocol stream packets. When incoming protocol messages adhere to a common protocol message length, protocol message base 936 and protocol common message length 934 can be used to determine the starting point of a first protocol message in TCP sequence space and that of subsequent protocol messages.

Figure 10:
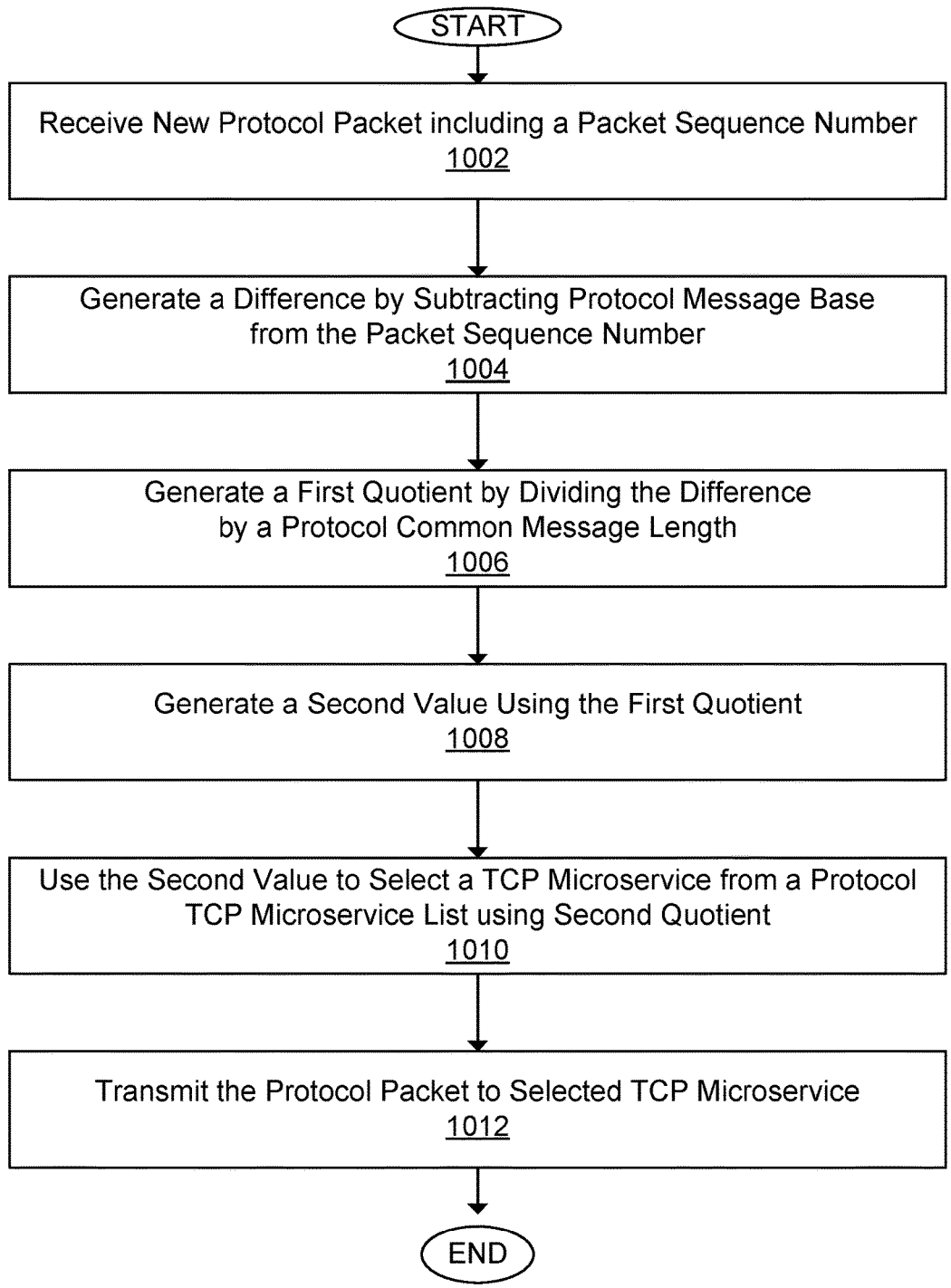
FIG. 10 is a process of receiving packets and selecting a TCP microservice to which to transmit them according to an embodiment.

FIG. 10 is a process of receiving packets and selecting a TCP microservice to which to transmit them according to an embodiment. The process embodied in FIG. 10 is used by an interface microservice to receive TCP packets and select TCP microservices to which to transmit them when the TCP packets contain a protocol message or a portion of a protocol message. After starting the process, the interface microservice receives a new protocol packet at 1002. In some embodiments, the new protocol packet is structured as in FIG. 8. The interface microservice recognizes the packet as a TCP packet, which includes a sequence number at all or parts of a protocol message as its payload.

At 1004, a difference is generated by subtracting a protocol message base from the packet sequence number. In one embodiment, the protocol message base is obtained by recording the first expected TCP sequence number after a TCP connection is established. In one embodiment, the protocol message base is updated to point to the end of the TCP sequence space of a protocol message (previous protocol message base plus the length of the protocol message). At 1006, a first quotient is generated by dividing the difference by a protocol common message length. Dividing the difference by a protocol common message length creates an integer value N such that N corresponds to the number of protocol messages that have been received since the initialization of the protocol message base value.

At 1008, a second value is generated using the first quotient. At 1010, the second value is used to select a TCP microservice from among TCP microservices in a protocol TCP microservice list. Different embodiments use different selection mechanisms to select a TCP microservice. For example, the second value may be used with an unbalanced distribution to favor selection of some TCP microservices over others. For another example, the second value may be generated by performing a modulus operation on the first quotient. In some embodiments, the second value may be obtained by a lookup in a table using the first quotient, or a function thereof, as an input.

At 1010, the second value is used to select a TCP microservice from the TCP protocol microservice list. At 1012, the protocol packet received at 1002 is transmitted to the selected TCP microservice. The process ends after 1012.

Figure 11:
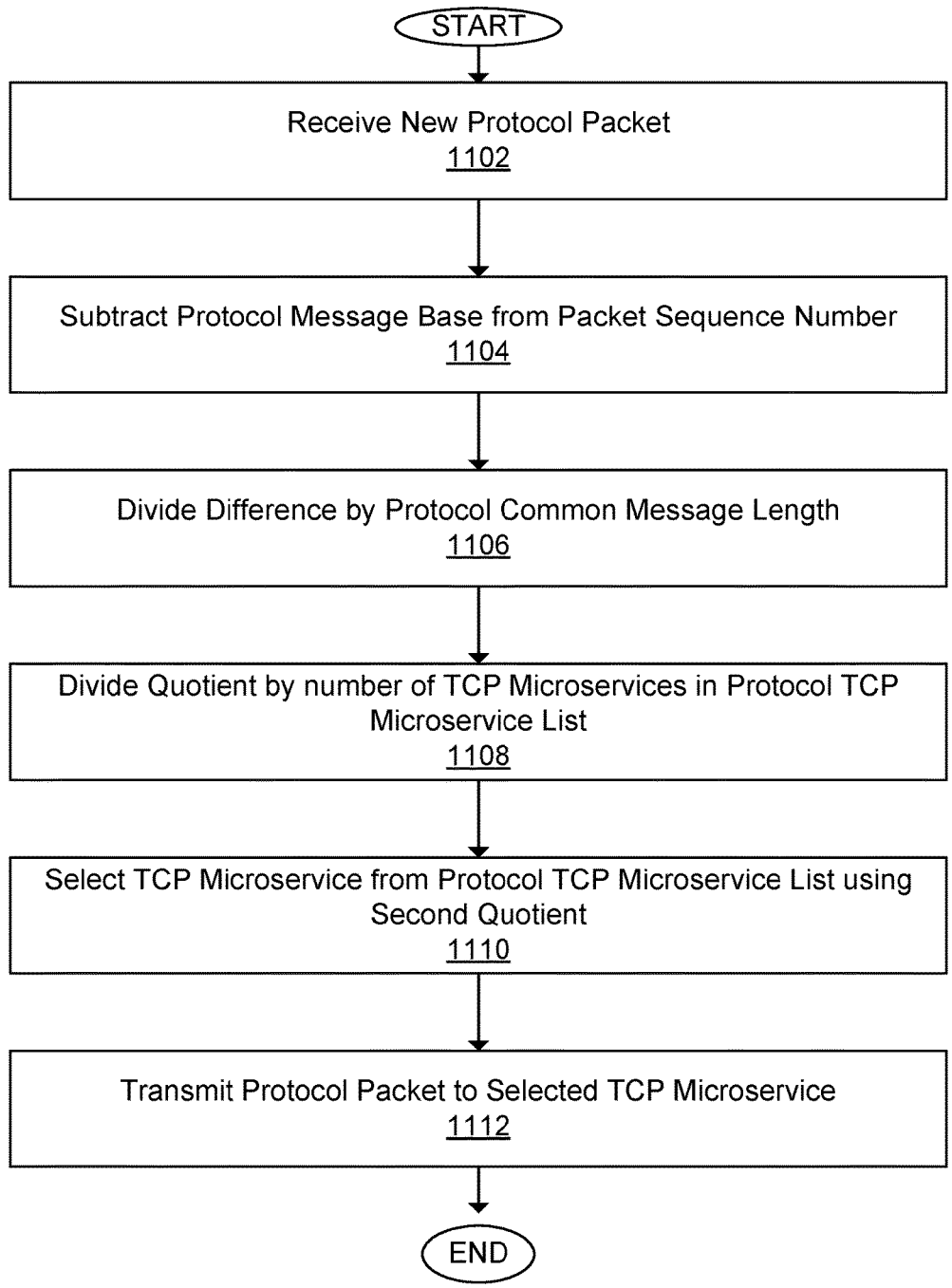
FIG. 11 is a process of receiving packets and selecting a TCP microservice to which to transmit them according to an embodiment.

FIG. 11 is a process of receiving packets and selecting a TCP microservice to which to transmit them according to an embodiment. The process embodied in FIG. 11 is used by an interface microservice to receive TCP packets and select TCP microservices to which to transmit them if the TCP packets contain a protocol message or a portion of a protocol message. After starting the process, the interface microservice receives a new protocol packet at 1102. In some embodiments, the new protocol packet is structured as in FIG. 8. The interface microservice recognizes the packet as a TCP packet, which includes a sequence number at all or parts of a protocol message as its payload.

At 1104, a difference is generated by subtracting a protocol message base from the packet sequence number. In one embodiment, the protocol message base is obtained by recording the first expected TCP sequence number after a TCP connection is established. In one embodiment, the protocol message base is updated to point to the end of the TCP sequence space of a protocol message (previous protocol message base plus the length of the protocol message). At 1106, a first quotient is generated by dividing the difference by a protocol common message length. Dividing the difference by a protocol common message length creates an integer value N such that N corresponds to the number of protocol messages that have been received since the initialization of the protocol message base value.

At 1108, a second quotient is generated by dividing the first quotient by a number of TCP microservices listed in a TCP protocol microservice list. In some embodiments, the second quotient is used to select among the available TCP microservices, corresponding to a round-robin selection. Different embodiments use different selection mechanisms to select a TCP microservice. For example, the second quotient may be used with an unbalanced distribution to favor selection of some TCP microservices over others. For another example, rather than generating a second quotient based on the first quotient, a modulus operation may be performed on the first quotient. In some embodiments, the second quotient may be obtained by a lookup in a table using the first quotient, or a function thereof, as an input.

At 1110, the second quotient is used to select a TCP microservice from the TCP protocol microservice list. At 1112, the protocol packet received at 1102 is transmitted to the selected TCP microservice. The process ends after 1112.

Figure 12:
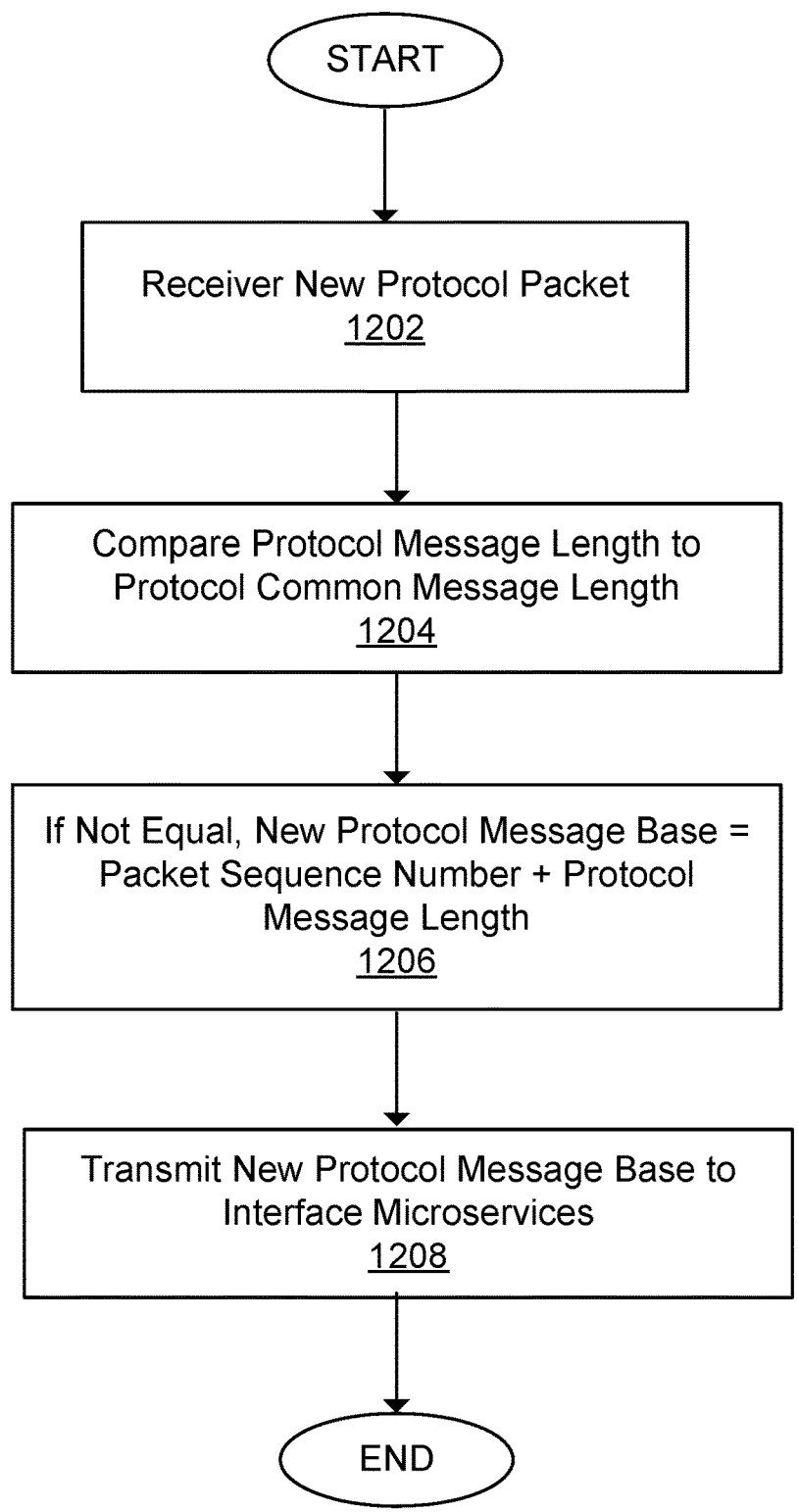
FIG. 12 is a process of setting a new protocol message base according to an embodiment.

FIG. 12 is a process of setting a new protocol message base according to an embodiment. The process embodied in FIG. 12 is used by an interface microservice to set a new protocol message base. After starting, the interface microservice at 1202 receives a new protocol packet. In some embodiments, the new protocol packet is structured as in FIG. 8. The interface microservice recognizes the packet as a TCP packet, which includes a protocol message length. At 1204, the protocol message length is compared to the protocol common message length. If they differ, a new protocol message base is generated at 1206 by adding the protocol message length to the packet sequence number. This process effectively moves the protocol TCP sequence space forward by the length of the protocol message that was not of the protocol common message length and resets the system to expect a new protocol message starting at the TCP sequence number of the next protocol message. At 1208, the new protocol message base is transmitted to other microservices, including other interface microservices. After 1208, the process ends.

FURTHER EXAMPLES

Example 1 provides a method including receiving a protocol packet comprising a sequence number, generating a difference by subtracting a protocol message base from the sequence number, generating a first quotient by dividing the difference by a protocol common message length, generating a second value using the first quotient, determining a Transmission Control Protocol (TCP) reassembly resource using the generated second value, and transmitting the protocol packet to the determined TCP reassembly resource.

Example 2 includes the substance of example 1. In this example, generating the second value comprises dividing the first quotient by a number of TCP microservices in a TCP protocol microservice list.

Example 3 includes the substance of example 1. In this example, generating the second value comprises performing a modulus operation on the first quotient.

Example 4 includes the substance of example 1. In this example, generating the second value comprises using the first quotient to obtain the second value from a lookup table.\

Example 5 includes the substance of example 1. In this example, the second value is to be used with an unbalanced distribution to favor selection of a first TCP microservice.

Example 6 provides a method including receiving a packet of a protocol message, the packet comprising a sequence number, a protocol type, and a protocol length, determining that the received protocol length differs from a common protocol message length, calculating a protocol message base by adding an existing protocol message base to the received protocol length, and updating the existing protocol message base using the calculated protocol message base.

Example 7 includes the substance of example 6. This example further includes transmitting the updated existing protocol message base to at least one other microservice.

Example 8 includes the substance of example 7. This example further includes transmitting the updated protocol message base to at least one interface microservice.

Example 9 provides a system including a memory, a hardware processor to use the memory and to execute instructions which cause the hardware processor to conduct a process including receiving a protocol packet, the protocol packet including a packet sequence number, generating a difference by subtracting a protocol message base from the packet sequence number, generating a first quotient by dividing the difference by a protocol common message length, generating a second value using the first quotient, using the second value to select a TCP microservice from the TCP protocol microservice list, and transmitting the protocol packet to the selected TCP microservice.

Example 10 includes the substance of example 9. In this example, generating the second value includes generating a second quotient by dividing the first quotient by a number of Transmission Control Protocol (TCP) microservices in a TCP protocol microservice list.

Example 11 includes the substance of example 9. In this example, generating the second value includes performing a modulus operation on the first quotient.

Example 12 includes the substance of example 9. In this example, generating the second value includes using the first quotient to obtain the second value from a lookup table.

Example 13 provides a system including a memory, a hardware processor to use the memory and to execute instructions which cause the hardware processor to conduct a process including receiving a packet of a protocol message, the packet including a packet sequence number, a protocol type, and a protocol length, determining that the received protocol length differs from a common protocol message length, calculating a protocol message base by adding an existing protocol message base to the received protocol length, and updating the existing protocol message base using the calculated protocol message base.

Example 14 includes the substance of example 13. In this example, the hardware processor is further to execute instructions which cause the hardware processor to transmit the updated protocol message base to at least one other microservice.

Example 15 provides a non-transitory computer-readable medium containing computer-executable instructions that, when executed by a processor, cause the processor to perform a method including receiving a protocol packet, the protocol packet including a packet sequence number, generating a difference by subtracting a protocol message base from the packet sequence number, generating a first quotient by dividing the difference by a protocol common message length, generating a second value using the first quotient, using the second value to select a TCP microservice from the TCP protocol microservice list, and transmitting the protocol packet to the selected TCP microservice.

Example 16 includes the substance of example 15. In this example, generating the second value includes dividing the first quotient by a number of Transmission Control Protocol (TCP) microservices in a TCP protocol microservice list.

Example 17 includes the substance of example 15. In this example, generating the second value includes performing a modulus operation on the first quotient.

Example 18 provides a non-transitory computer-readable medium containing computer-executable instructions that, when executed by a processor, cause the processor to perform a method including receiving a packet of a protocol message, the packet including a packet sequence number, a protocol type, and a protocol length, determining that the received protocol length differs from a common protocol message length, calculating a protocol message base by adding an existing protocol message base to the received protocol length, and updating the existing protocol message base using the calculated protocol message base.

Example 19 includes the substance of example 18. This example further includes transmitting the updated existing protocol message base to at least one other microservice.

Example 20 includes the substance of example 18. This example further includes transmitting the updated existing protocol message base to at least one interface microservice.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments accomplish the data handling and distribution by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment are stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

The above may provide many benefits. As an example, consider an embodiment of an event generator microservice responsible for inserting events into a database upon detection of an anomaly. If executing upon a virtual host with limited disk throughput, the microservice according to an embodiment is configured to weigh event count and disk capacity highly while weighing other aspects of performance, such as CPU, memory or I/O usage, at lower levels. The loading provided by this microservice to lower-level microservices aims to accurately reflect the capabilities of this microservice. Additionally, if the microservice is relocated to a physical service with ample disk capacity but limited memory, the weightings may be reconfigured to increase the memory utilization component while decreasing the disk capacity component of the overall load metric.

What is claimed is:

1. A method comprising:
   receiving a protocol packet, the protocol packet comprising a sequence number;
   generating a difference by subtracting a protocol message base from the sequence number;
   generating a first quotient by dividing the difference by a protocol common message length;
   generating a second value using the first quotient;
   determining a Transmission Control Protocol (TCP) reassembly resource using the generated second value; and
   transmitting the protocol packet to the determined TCP reassembly resource.

2. The method of claim 1, wherein generating the second value comprises dividing the first quotient by a number of TCP microservices in a TCP protocol microservice list.

3. The method of claim 1, wherein generating the second value comprises performing a modulus operation on the first quotient.

4. The method of claim 1, wherein generating the second value comprises using the first quotient to obtain the second value from a lookup table.

5. The method of claim 1, wherein the second value is to be used with an unbalanced distribution to favor selection of a first TCP microservice.

6. A system comprising:
a memory;
a hardware processor to use the memory and to execute instructions which cause the hardware processor to:
receive a protocol packet, the protocol packet comprising a packet sequence number;
generate a difference by subtracting a protocol message base from the packet sequence number;
generate a first quotient by dividing the difference by a protocol common message length;
generate a second value using the first quotient;
use the second value to select a TCP microservice from a TCP protocol microservice list; and
transmit the protocol packet to the selected TCP microservice.

7. The system of claim 6, wherein generating the second value comprises generating a second quotient by dividing the first quotient by a number of Transmission Control Protocol (TCP) microservices in a TCP protocol microservice list.

8. The system of claim 6, wherein generating the second value comprises performing a modulus operation on the first quotient.

9. The system of claim 6, wherein generating the second value comprises using the first quotient to obtain the second value from a lookup table.

10. A non-transitory computer-readable medium containing computer-executable instructions that, when executed by a processor, cause the processor to:
receive a protocol packet, the protocol packet comprising a packet sequence number;
generate a difference by subtracting a protocol message base from the packet sequence number;
generate a first quotient by dividing the difference by a protocol common message length;
generate a second value using the first quotient;
use the second value to select a TCP microservice from a TCP protocol microservice list; and
transmit the protocol packet to the selected TCP microservice.

11. The non-transitory computer-readable medium of claim 10, wherein generating the second value comprises dividing the first quotient by a number of Transmission Control Protocol (TCP) microservices in a TCP protocol microservice list.

12. The non-transitory computer-readable medium of claim 10, wherein generating the second value comprises performing a modulus operation on the first quotient.

* * * * *